*(12)* United States Patent
Abedini et al.

(10) Patent No.: US 12,309,616 B2
(45) Date of Patent: May 20, 2025

(54) COMMUNICATION CONFIGURATIONS USING ASSISTING INFORMATION FOR CHANGING CONDITIONS IN WIRELESS NETWORKS

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/450,065

(22) Filed: Oct. 5, 2021

(65) Prior Publication Data

US 2022/0116795 A1    Apr. 14, 2022

Related U.S. Application Data

(60) Provisional application No. 63/089,505, filed on Oct. 8, 2020.

(51) Int. Cl.
*H04W 24/02*     (2009.01)
*H04L 5/14*      (2006.01)
(Continued)

(52) U.S. Cl.
CPC .......... *H04W 24/02* (2013.01); *H04L 5/1438* (2013.01); *H04W 72/0453* (2013.01); *H04W 72/20* (2023.01)

(58) Field of Classification Search
CPC . H04W 24/02; H04W 72/0453; H04W 72/20; H04W 72/542; H04L 5/1438
See application file for complete search history.

(56) References Cited

U.S. PATENT DOCUMENTS 11,778,650 B2   10/2023   Zhang et al.
11,848,737 B2   12/2023   Zhou et al.
(Continued)

FOREIGN PATENT DOCUMENTS

CN    103703715 A    4/2014
EP    3089513 A1    11/2016

OTHER PUBLICATIONS

International Search Report and Written Opinion dated Jan. 31, 2022 from corresponding PCT Application No. PCT/US2021/053811.

*Primary Examiner* — Andrew C Oh
(74) *Attorney, Agent, or Firm* — QUALCOMM Incorporated

(57) ABSTRACT

Aspects for predicting communication configurations for a wireless node are provided. Assisting information is measured or assessed at a first wireless node. The assisting information may include clutter and blocker measurements, self-interference measurements, and various beam, frequency, and modulation-related measurements. A control node may determine a communication configuration based on the assisting information. The communication configuration may be predicted for use at a subsequent time period. The first wireless node may receive and approve the configuration. The first wireless node may use the communication configuration in a subsequent communication with a second wireless node. The communication configuration may include, for example, whether the first wireless node (Continued)

will communicate using a full-duplex or half-duplex configuration and the TX/RX beam configuration for the node.

30 Claims, 12 Drawing Sheets

(51) Int. Cl.
*H04W 72/0453* (2023.01)
*H04W 72/20* (2023.01)

(56) References Cited

U.S. PATENT DOCUMENTS

| | | |
|---|---|---|
| 2013/0286873 A1 | 10/2013 | Wilkinson et al. |
| 2014/0073337 A1 | 3/2014 | Hong et al. |
| 2016/0192224 A1 | 6/2016 | Faerber et al. |
| 2017/0013480 A1 | 1/2017 | Chen et al. |
| 2018/0234230 A1 | 8/2018 | Kalhan |
| 2018/0295631 A1 | 10/2018 | Froberg et al. |
| 2019/0319840 A1 | 10/2019 | Cheng et al. |
| 2020/0007247 A1 | 1/2020 | Gulati et al. |
| 2020/0313779 A1* | 10/2020 | Kim .................. H04B 17/24 |
| 2021/0306886 A1* | 9/2021 | Jung ................ H04B 17/373 |
| 2022/0182160 A1* | 6/2022 | Su ................... H04B 17/309 |
| 2023/0147613 A1* | 5/2023 | Karjalainen .......... G01S 5/0236 |
| | | 342/463 |

* cited by examiner

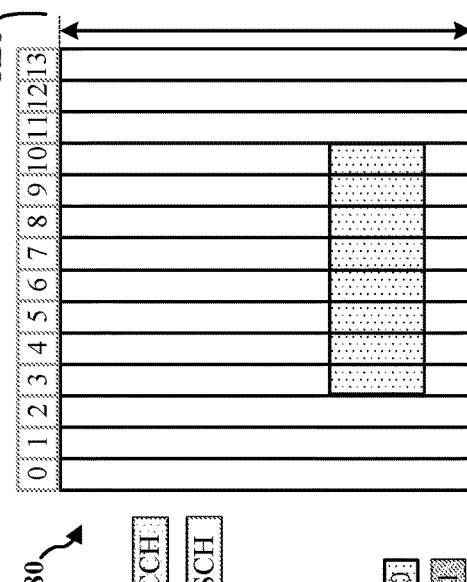
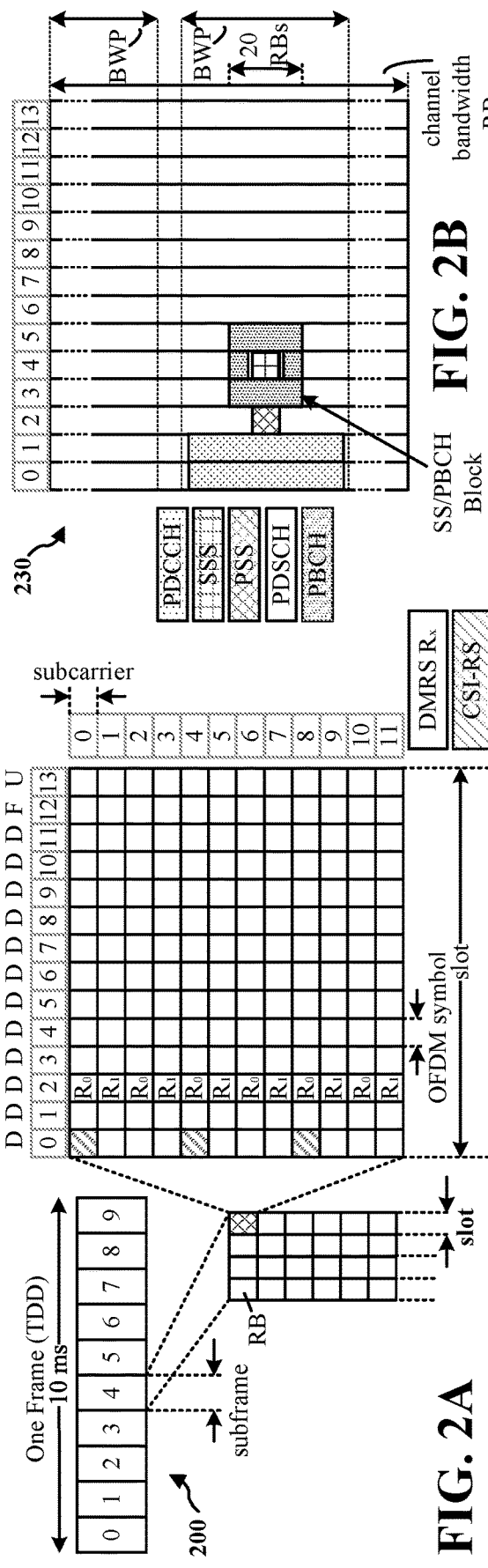
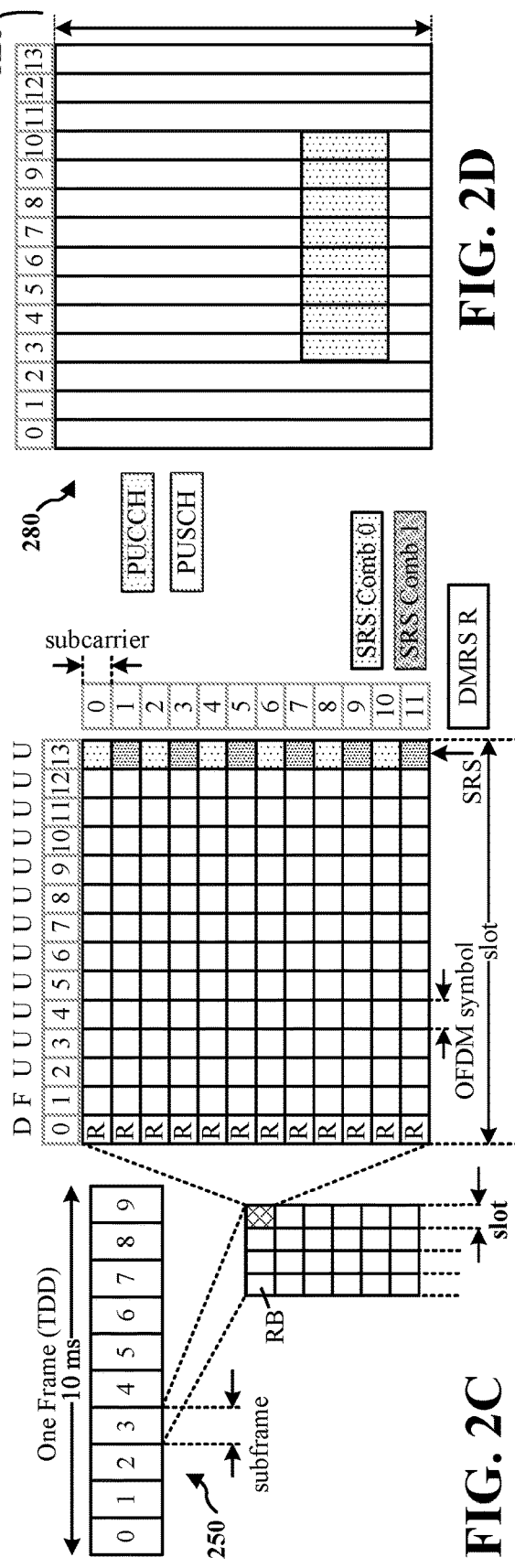
FIG. 2A
FIG. 2B
FIG. 2C
FIG. 2D

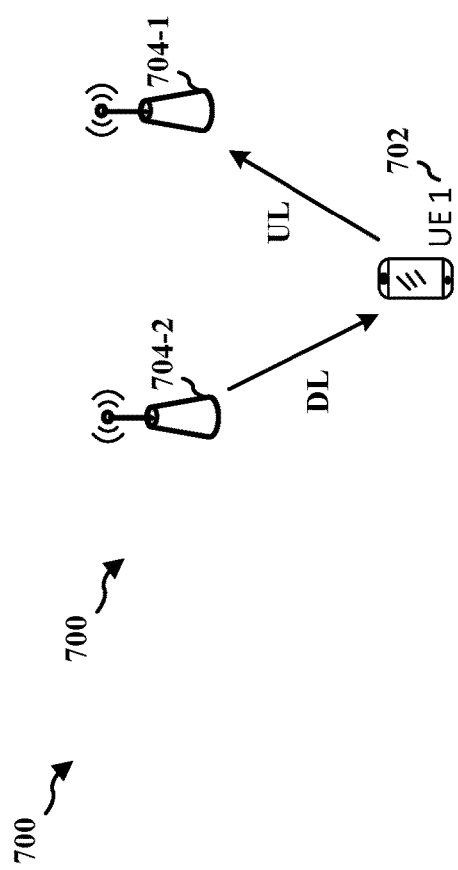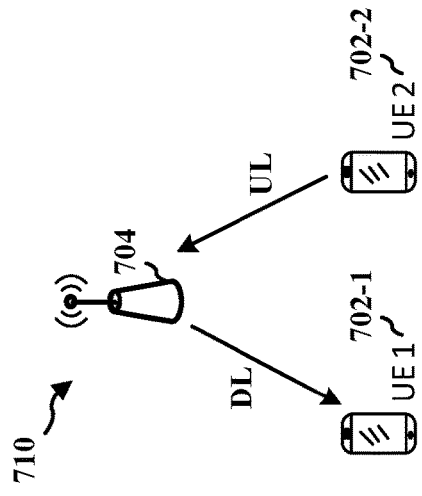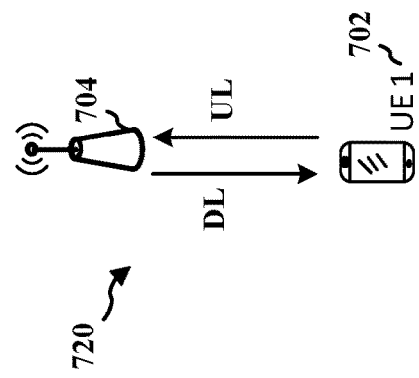
FIG. 7A
FIG. 7B
FIG. 7C

COMMUNICATION CONFIGURATIONS USING ASSISTING INFORMATION FOR CHANGING CONDITIONS IN WIRELESS NETWORKS

CROSS-REFERENCE TO RELATED APPLICATION

This application claims the benefit of and right of priority to U.S. Provisional Application No. 63/089,505, entitled "Communication Configurations Using Assisting Information For Changing Conditions in Wireless Networks" and filed Oct. 8, 2020, the contents of which are hereby incorporated by reference as is fully set forth herein.

BACKGROUND

Technical Field

The present disclosure relates generally to communication systems, and more particularly, to predictive communication configurations in wireless networks.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Different types of wireless nodes can transmit data using different communication configurations. These configurations may include, for example, duplex modes (full or half duplex), and transmit or receive (TX/RX) beam configurations for transmitting or receiving data over spatial channels, or using beam steering or spatial multiplexing. As 5G NR currently enters into unlicensed spectra and the number and types of networks and nodes increase, the communication configuration for a given wireless node may need to be adjusted more often to take advantage of the higher bandwidth accorded full duplex (FD), to widen TX/RX beam coverage or limit transmissions to half-duplex (HD), or to ensure successive transmissions are reliably received to accommodate obstructive cluttering/blocking features that may suddenly emerge. Channel conditions may change more rapidly, and the problem of changing conditions may be exacerbated if the wireless node (or the obstacle) is moving. As well, the sudden emergence of self-interference phenomena (a node's own transmitted beam striking a reflective surface and returning to interfere with the node's own transmit/receive activity) may require the downgrade of configurations—such as switching to half-duplex—in the same way that the sudden disappearance of these interfering phenomena may militate in favor of communication upgrades. These upgrades may include fast transitions to FD and more focused TX/RX beams to increase data transmission/reception rates when the opportunities may suddenly arise.

Conventional wireless networks lack effective procedures or techniques for configuring wireless nodes to make predictive measurements that can be used to optimize future communication configurations. Most existing networks instead preferentially assess present configurations of their constituent nodes based on current channel conditions, and schedule communications based on those conditions. Current channel conditions may be those measured by receipt of different reference signals and analysis of dedicated signals such as channel quality indicators, and other Quality of Service (QoS) metrics whose primary focus is on present channel conditions. These networks, in short, may devote their resources for scheduling subsequent transmissions based on their assessments of the channels' present conditions, rather than on predicted future channel conditions.

While the assessments may be current when made, they may be obsolete at the time the subsequent transmissions are scheduled. As a result, when environmental circumstances change (whether favorably or adversely), the network nodes may often be relegated to operating in a reactive state in which present configurations can be changed only after blocking events or other obstacles have long since emerged and degraded performance. That is to say, before a duplex mode, a beam-steering event or position of a wireless node changes, or still another channel condition can change, the network may have sacrificed substantial bandwidth or introduced unnecessary latencies by not taking predictive assessments into account that may have provided better indicators beforehand of the channel dynamics.

Accordingly, in one aspect of the disclosure, a control node receives assisting information from one or more other nodes, the assisting information including measurements taken over a wireless channel. In one configuration, the assisting information is associated with a wireless channel of a first wireless node having certain channel conditions. The control node may determine a communication configuration to accommodate communication of the first wireless node over the wireless channel when certain channel conditions have changed, wherein the communication configuration is determined based on the assisting information.

In an aspect of the disclosure, a method, a computer-readable medium, and an apparatus are provided. A method of wireless communication by a control node includes receiving assisting information from a first, the assisting information being associated with a wireless channel having certain channel conditions, and determining a communication configuration to accommodate communications of the first wireless node over the wireless channel when the certain channel conditions have changed, wherein the communication configuration is determined based on the assisting information.

An apparatus may include a control node. The control node includes a least one processor configured to receive assisting information from a first wireless node, the assisting information being associated with a wireless channel of the first wireless node having certain channel conditions, and determine a communication configuration to accommodate communications of the first wireless node over the wireless channel when the certain channel conditions have changed, wherein the communication configuration is determined based on the assisting information.

In still another aspect of the disclosure, a first wireless node includes means for receiving assisting information from a second wireless node over a wireless channel having certain channel conditions, and means for determining a communication configuration to accommodate communications with the second wireless node over the wireless channel when the certain channel conditions have changed, wherein the communication configuration is determined based on the assisting information.

In yet another aspect of the disclosure, a non-transitory computer-readable medium stores code. The code that, when executed by at least one processor, is configured to receive assisting information from a second wireless node over a wireless channel having certain channel conditions, and determine a communication configuration to accommodate communications with the second wireless node over the wireless channel when the certain channel conditions have changed, wherein the communication configuration is determined based on the assisting information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 7A-7C are diagrams illustrating examples of full duplex (FD) communication.

DETAILED DESCRIPTION

Figure 1:
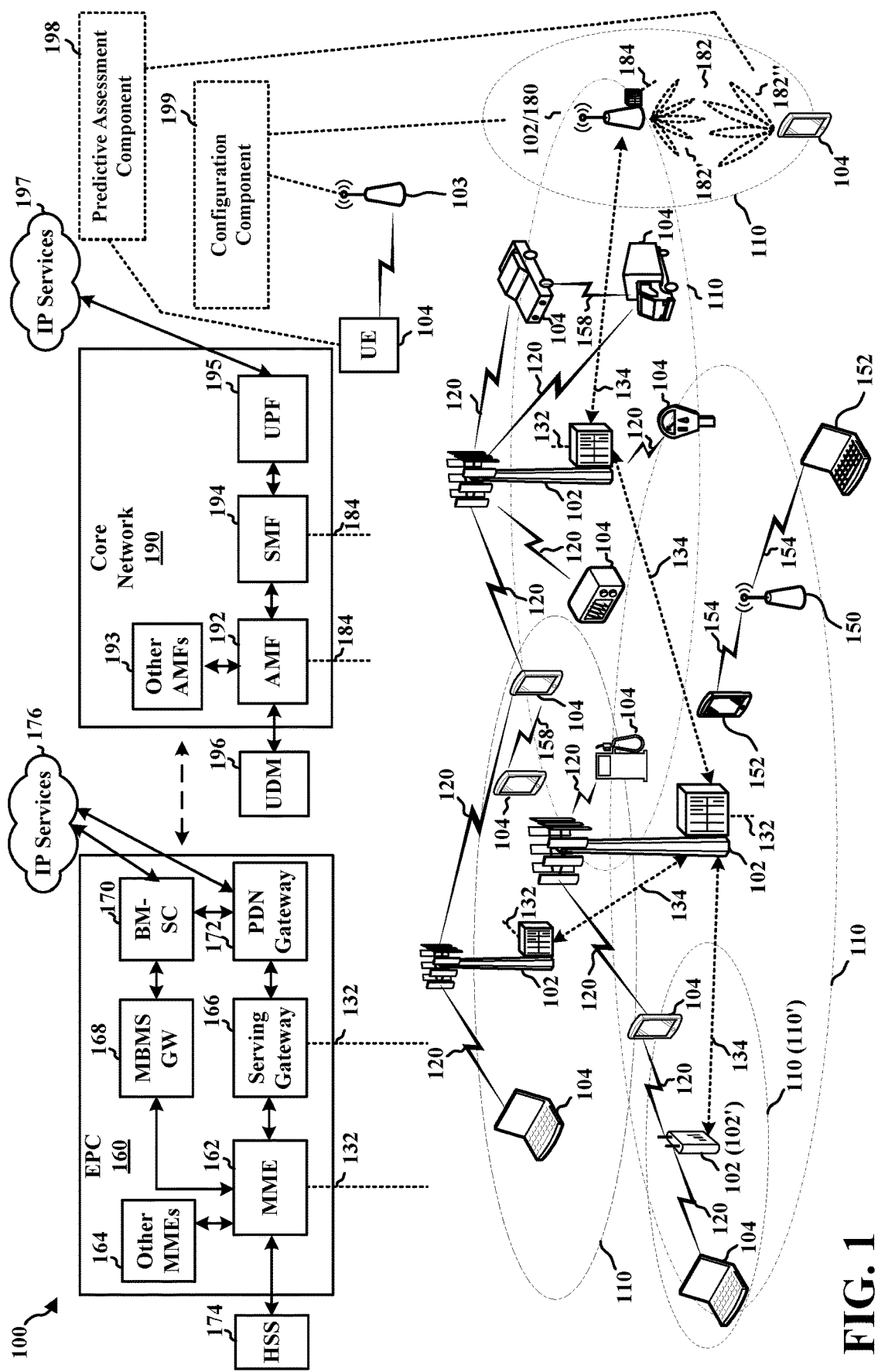
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring still to FIG. 1, the wireless communication system and access network 100 may include an integrated access and backhaul (IAB) network that includes multiple cells in communication with each other to provide an access network and a backhaul network to a core network such as the core network 190 or the Evolved Packet Core (EPC) 160. The IAB network may include one or more IAB nodes 103. The IAB nodes may exchange communication directly with other IAB nodes 103, with a base station 102 or 180, and/or with UEs 104.

Referring again to FIG. 1, in certain aspects, a wireless device such as the UE 104 or an IAB node 103 may be configured to provide assisting information in order to establish a communication configuration for the IAB node 103 with another wireless node. The IAB node 103 may be a parent IAB node. The UE 104 or IAB node 103 may include a predictive assessment component 198 configured to determine assisting information, such as self-interference levels, cluttering phenomena, travel information such as moving obstacles, timing information such as changes to channel conditions, and the like. The UE 104 or IAB node 103 may use their predictive assessment components 198 to make predictive calculations that identify optimal communication configurations for communicating with another specified node in some future time period.

The UE 104 or IAB node 103 may make self-interference measurements. Self-interference measurement (SIM) information is a type of assisting information acquired when a wireless node performs a measurement to determine how much of the interference at the node is due to clutter (i.e., reflective surfaces) reflecting the node's own transmissions back to itself. Self-interference measurements can lead to predictions about how to configure the nodes in a future communications session to mitigate, or altogether avoid, the interference. For example, the duplex mode may be switched to half-duplex to reduce reflections, or the beam directions may be changed.

The SIM information can be used by a node (e.g., a UE, base station, IAB node, etc.) to help predict a communication configuration for itself or another node for a future communication. In its prediction analysis, the node may consider the SIM results in light of other assisting information. For example, the node may determine whether it or the clutter causing the self-interference is in motion. This determination may reveal whether the self-interference will likely be present or absent during a future communication. For instance, if the clutter is moving away from the receiving source, the predicting node may conclude that it can safely run at full duplex during the future time slot.

Thus, the UE 104 may obtain, through a variety of measurements including SIM measurements, a collection of relevant information that may be processed via predictive assessment component 198 within the UE to determine a configuration communication for a future exchange. The UE may then transmit the communication configuration to base station 180, for the base station to authorize the communication configuration for use during the future time period.

In other configurations, the UE 104 may instead transmit to the base station 180 the assisting information for the base station 180 to use in determining a suitable communication configuration for the UE 104 for use in a future time slot. In this event, the base station 180 may use configuration component 199 to process the assisting information sent by the UE 104 to make the necessary predictions and determine a suitable communication configuration to use in the time slot. The base station may subsequently transmit the determined communication configuration to the UE 104. In determining this communication configuration, the base station may also obtain relevant assisting information on its own, or from other sources.

As noted, in some configurations, the base station 180 may receive a candidate communication configuration from the UE 104 along with a request to use the communication configuration in a future communication. The base station 180 may use its configuration component 199 to analyze the communication configuration (rather than just the assisting information as above), and, if the base station confirms that the communication configuration is acceptable, the base station may authorize use of the communication configuration, e.g., in a subsequent communication between the base station 180 and the UE 104.

In other configurations involving the IAB 103 acting in a parent capacity, the IAB 103 may use configuration component 199 along with assisting information (e.g., predictive measurements, self-interference measurements, etc.) to determine a configuration communication to be used in a communication with a child IAB node.

While the above descriptions have focused primarily on the base station 180 and UE 104 of FIG. 1, it should be understood that the descriptions are exemplary in nature. For example, the respective activities performed by the base station 180 and UE 104 may be performed by other wireless nodes. Thus, the determination of a communication configuration, and the collection and use of the assisting information may equally be determined and implemented by two or more arbitrary wireless nodes. As will be seen, such nodes may include without limitation wireless relays, IAB nodes, V2X nodes, etc. In addition, although the above-determined future communication slots may include a downlink or an uplink shared or control channel in aspects of a 5G network, in other configurations the future communication slots may constitute backhaul communications, sidelink communications, node-to-node communications, and other channels or links that may be specific to the network topology.

Accordingly, although the following description may be focused on UEs, the concepts described herein may be applicable to other areas involving virtually any wireless nodes. Further, although the following description may be focused on 5G NR, the concepts described herein may be applicable to other similar areas, such as LTE, LTE-A, CDMA, GSM, and other wireless technologies.

In another configuration, a control node may be used to receive the assisting information and determine the communication configuration for one or more other wireless nodes. In this configuration, one or both of the first or second wireless nodes may transmit assisting information to the control node. The control node may analyze this assisting information and, based on its analysis, may determine a communication configuration for one or both of the first or second wireless nodes along with scheduling information identifying a future slot. Accordingly, in this configuration, the control node can act on behalf of other wireless nodes, and can assess communication configuration based on received assisting information. The control node can provide the communication configuration to the first node over a channel, and the first node can use the communication configuration, including the duplex mode and the TX/RX beam configuration, to communicate with a second node. In one configuration, the control node does not itself participate in the subsequent communications, but instead the control node determines the communication configurations of the channel as described herein.

An example of the "control" node configuration may be found with respect to FIG. 1. The base station 180 may act as the control node for any two of the UEs 104. The communication configuration may otherwise be computed from the vantage point of the base station 180 by taking into account the assisting information provided by, and specific to, one or both of the second and third UEs. This configuration is not limited to the base station and UEs of FIG. 1, but also extends to wireless nodes in general, with one wireless node performing the communication configuration for a data exchange between second and third wireless nodes, where one or both of the second and third wireless nodes may send the assisting information to the first node.

The term "communication configuration" as described herein may include a set of parameters, values, constraints, and other data for use by one wireless node during its communication over some channel with at least one other wireless node. The communication configuration typically takes into account changing channel conditions, travel information about the nodes, timing information, and any other determinations relevant to the subsequent communication between two wireless nodes. For example, a communication configuration may include a duplex configuration. UEs 104 and other wireless nodes may be configured to operate in full duplex (FD) mode, during which the node is simultaneously transmitting and receiving information to and from one or more other wireless nodes. Thus, in FD for example, the node can be transmitting data to one node while simultaneously receiving data from a second node. Full duplex may also refer to a UE simultaneously exchanging data (transmit and receive) with a base station or another UE or node (e.g. on a side link). FD or HD can refer to data exchanges between wireless nodes in general.

In some aspects of the disclosure, communication configurations may also include beam configuration, such as a node's beam number, beam shape, spatial energy distribution, spatial multiplexing parameters, etc. Modern UEs and other wireless nodes often include multiple antennas or directional antennas. Thus, more complex communication configurations can be established to account for antenna arrays of a wireless node. A node may use a narrowly focused beam to receive energy transmitted at a high data rate from another wireless node, for example. In other cases, there may be obstacles or clutter that give rise to interference, such as in a vehicle node (e.g., a vehicle-to-everything node V2X). This interference may vary as a function of time. The communication configuration of the V2X may involve varying the spatial direction of its transmit and receive antennas to accommodate this variance and avoid the obstacles. Where the clutter or obstacles dissipate, the base station may direct the V2X to increase its beam width to cover more area, for example. Wireless nodes may also be capable of spatial division multiple access, beamforming, transmit diversity, and the like. The communication configuration may be predicted using assisting information to establish the beam configuration of the V2X when it is scheduled to transmit or receive data on the uplink or downlink. As with generic communication configurations discussed above, these communication configurations also may apply to any wireless nodes with directional antenna capability. For nodes with omnidirectional power, the node may be configured with different transmit and receive power levels, which also may dynamically change over time based on earlier predictions. In summary, the communication configuration can be broadly construed to include only one or a few parameters in some configurations, or a large number of parameters in other configurations.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
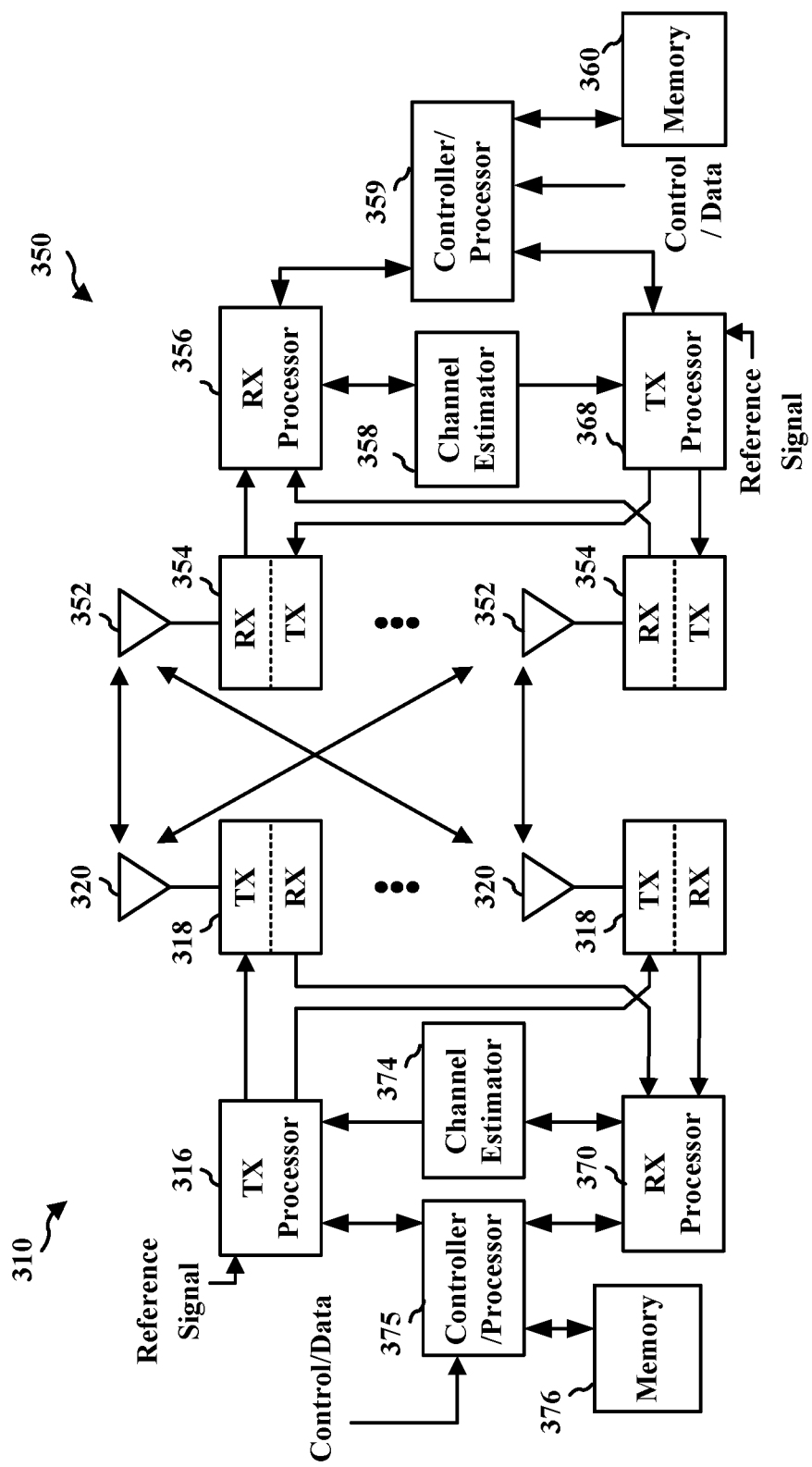
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

NR is configured to inter-operate with a number of different network technologies, including in urban environments that may involve an ever-increasing number of obstacles to wireless transmissions. NR is also configured to operate in a wide array of frequency bands, including unlicensed spectra which are customarily used in the context of other networks (e.g., IEEE 802.11ay, which can operate in the 60 GHz millimeter wave spectrum). In the face of all of these new obstacles and challenges, developers of NR and similar network technologies are continuing to seek new ways to provide robust network access with clear channels for fast and unimpeded transmissions, and to transfer data in a faster and more efficient manner.

Common obstacles to transmitting and/or receiving nodes include existing hills, mountains, forests, and terrain. Increasing such obstacles may include increasing numbers of cars, trucks, buildings, construction equipment, and the like. The increasing number of reflecting surfaces, such as vehicles, mirrored architecture, street signs, and the like, have also contributed to the phenomenon of self-interference, which may occur when a transmitted signal strikes a reflective surface and the energy bounces back to or near its origin, thereby interfering with the transmitting signal at its origin. Self-interference is increasingly common when devices are transmitting in FD, i.e., they are transmitting and receiving signals concurrently. For example, a portion of the transmitted signal in FD may strike a reflective surface and return to interfere with the receiving activity of the transceiver at the communicating node. Obstacles, sources of interference, and the attenuating effects of electromagnetic radiation may also vary at different frequencies. Thus developers must configure wideband network technology to predict and accommodate the challenges that arise from multi-frequency networking.

In addition to self-interference and the increasing number of obstacles that may be more prevalent at different frequencies, an increasing number of wireless devices are becoming mobile. Wireless nodes are being incorporated into vehicles as V2X nodes. Many of the objects that cause self-reflective interference to transmitting nodes are also mobile, such as the reflective surfaces of vehicles. Even a walking pedestrian's exposure to sources of interference changes with time, since often the pedestrian carrying a UE may only be within an angle that causes reflection from an interfering structure for a few moments before the pedestrian is clear. Further, even where reflective material is stationary, as long as the wireless node is moving then the distance to the interference source changes with time. Assisting information may be provided to accommodate these variations so that a receiving node can predict and address them for purposes of facilitating future communications.

Wireless nodes in modern networks generally focus on sending and receiving different types of reference signals to measure channel conditions to determine what characteristics the UE should use in communicating with the UE or with another UE or node. For example, in LTE and different aspects of 5G, after the eNB/gNB measures channel conditions based on reference signals from the respective UEs, the eNB/gNB then provides the UE with specified transmit power and uplink/downlink scheduling. However, as wireless networks become progressively advanced, wireless nodes can transmit and receive data using multiple beams, and spatial diversity and multiplexing at the UE or node side are now common. In addition, newer network technologies have employed an increasing use of backhaul and sidelink channels to transmit and receive information. Thus as in the example described supra, wireless nodes often can communicate directly over side links or dedicated two-way channels.

The current model of scheduling communications is often based in large part on the assessment of present channel conditions. This technique may often produce assumptions that the measured channel conditions will be generally the same during subsequent scheduled communication slots. With the increasing mobility of nodes, the larger impact of obstacles and clutter, and the wide frequency ranges of modern nodes, the current model has its drawbacks. While different channel conditions and different obstacles to signal transmission may be present at varying degrees at the time the channel is measured, the same conditions may be significantly different at the time the wireless node is scheduled for uplink or downlink transmission.

Thus, in the face of significant noise and adverse conditions, the conventional gNB may instruct a UE to perform transmissions at high power using spatial beams positioned using a lower bandwidth but that may increase the UE's likelihood to successfully transmit or receive data, for example. However, as noted above and especially given the increasing mobility of devices and networks' encroachments into different frequencies, these channel conditions may have been assessed based on obstacles that no longer are present (e.g., they have moved out of the way) or on devices that are no longer transmitting. Thus, had a more forward looking or predictive detection method been employed, the UE may have been able to change its configuration to spatially focus its beams and transmit at FD, for example, to maximize its uplink transmit speed or receive speed.

Similarly, the gNB may use conventional techniques to inadvertently overstate the clarity of a channel when it is free of interference upon measurement, only to have subsequent obstacles become present or other channel conditions degrade at the time of the scheduled transmission. These problems may also affect inter-node communications, such as V2X nodes signaling one another over a sidelink.

In accordance with one aspect of the disclosure, the wireless nodes use one or more predictive techniques to measure both channel conditions and phenomena like self-interference and to determine, based on measurements or information acquired during a first time period (assisting information), the communication configuration for communications between two (or more) wireless nodes that occur during a second time period. The configurations herein may focus on predictive techniques for indicating whether a UE can operate with a particular communication configuration, such as, by way of example, a duplex configuration (FD vs. HD), or a beam shape, number or configuration for spatial transmission, beamforming, and multiplexing, and other beam scheduling, management, modulation, guard band adjustment, cyclic prefix size, subcarrier spacing, orthogonalizing reference signals, and the like. In some implementations, these and other criteria may be part of the assistance information. In other implementations, certain of these characteristics may also be part of the communication configuration for use in future slots. For example, where interference is low but increasing, the communication configuration may call for a wider guard band than normal that is proportionate to the time to the future communication.

Figure 4:
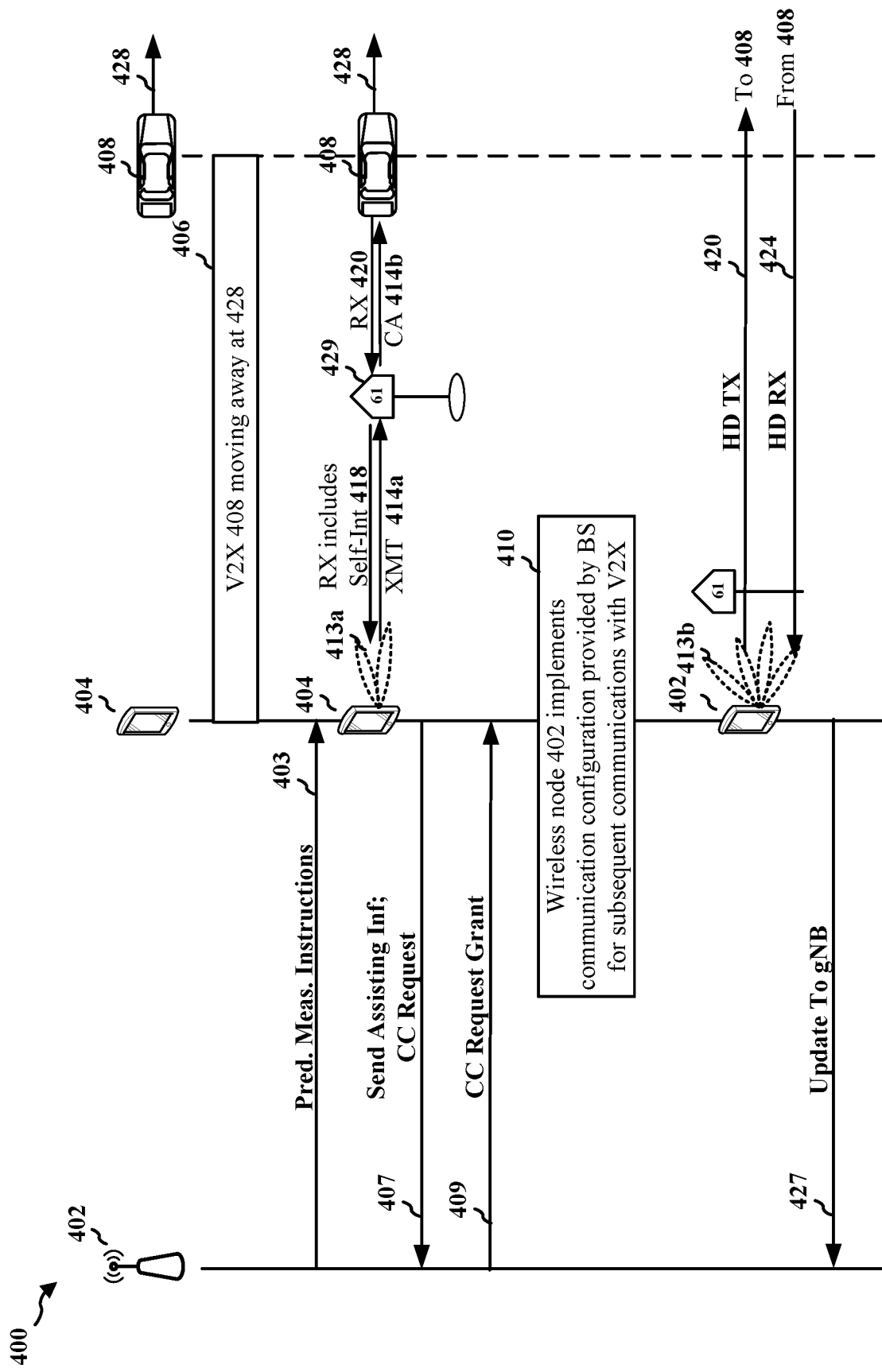
FIG. 4 is a timing diagram showing messaging between a base station and an exemplary UE for predicting a communication configuration of the UE.

FIG. 4 is a timing diagram 400 showing messaging between a base station and an exemplary UE for predicting a communication configuration of the UE based on assistance information. The example includes a base station 402 in contact with a UE 404. One or the other (or both) of the base station 402 and/or UE 404 may be identified to receive assistance information, to make predictive measurements, based on the assistance information, and ultimately to establish a communication configuration between the UE and the vehicle 408 with node V2X in a future slot. As noted in block 406, vehicle 408 (and hence V2X) is moving away from the UE 404 at some speed v in a direction 428 away from UE 404.

At 403, the base station 402 may signal the UE, over a control channel, instructions for the UE 404 to make channel measurements, measure for self-interference, or otherwise make measurements to obtain assisting information for use in predicting a communication configuration for a link between UE 402 and V2X 408.

UE 404 thereupon makes measurements or assessments in the signaling as shown; in other cases, the base station 402 need not instruct the UE 404 and the actions of the UE may be automated. In the example shown, UE has been configured to use a generally narrow beam configuration 413a with one transmit beam and one receive beam. UE 404 transmits a channel assessment signal 414a/414b which reaches a vehicle node V2X 408. UE 404 in turn may receive a response RX 420 from the V2X (e.g., via a sidelink) that provides some initial information about the status of V2X and/or the channel conditions faced by V2X. UE 404 also detects the presence of self-interference from, in this example, a large road sign 429 which reflects a portion of the transmit signal 414a as a self-interfering signal 418 into the beam path 413a of UE 404. Thus, using one of more transmissions, UE 404 may obtain assisting information in the form of self-interference data as well as certain data regarding V2X's received channel conditions. In other examples, the UE's signal may not be configured to elicit a response from the V2X in vehicle 408. The self-interference signal 418 indicates to the UE 404 that clutter is present at a certain distance from UE at a certain time and that the clutter may interfere with some small fraction of communications that are directed towards the clutter at a certain measurable future time.

At 407, the assisting information acquired from these efforts is transmitted in an uplink channel to the base station 403. The base station 402 may perform some calculations that determine the relative speed of vehicle 408 (this function may alternatively be performed at the UE 404). In other configurations, the UE's 404 assisting information may include indicia of detected blockers which may block or attenuate the transmitting signal, which may include trees, rock formations, buildings, hills and virtually any object in the way. The base station 402 may record this information for future reference, for example, in directing network communications for other UEs. In an implementation, the communication 407 also includes a request for the base station 402 to provide a communication configuration to the UE 404 based on the assisting information and the predictions it makes about the nature of the channel. In alternative configurations, these predictions may instead be made directly at the UE 404, in which case the UE 404 may perform some or all of the predictive assessments described above with respect to the base station 402. For example, the UE 402 may be a smart UE and may include a radar for detecting clutter. The UE 402 may also include a sophisticated processing system for predicting optimal configurations, e.g., based on a combination of clutters, blockers, the desired recipient node, and the relative movements of each entity. In another example, both the UE and the clutter may be moving, such as in the case where the UE 404 is a handheld device with a user in a vehicle as well and the clutter is a large truck moving on the freeway between UE 404 and V2X. In this case, the self-interference may have more of a continuous nature if the relative speeds and positions of the vehicles happen to remain approximately constant. In other examples, when making measurements or assessments as with XMT 414a-b, the UE 404 may detect a current source of clutter which moves away (e.g., the sign 429 may be reflective clutter until the vehicle with UE 404 passes the sign), and, as another example, as clutter or a blocker (e.g., large trees adjacent a curving freeway) show up and then move away, a new source of clutter may then show, (e.g., another truck partially reflecting the signal in the opposite lane to the vehicle with UE 404). In all of these cases, the UE 404 and/or base station 402 may take each of these measured factors into account when predicting an optimal communication configuration. In another configuration, the UE makes measurements that attempt to incorporate all of these sources of interference and then sends the results as assisting information to the base station 402, the latter of which has the processing power, and thus performs the primary predictions and ultimately produces the communication configuration to allow the UE 402 to communicate with V2X in a later time slot.

In still other configurations, the UE 404 (whether stationary or moving) may have a map that allows it to use its measurements to make relative determinations. The map may alternatively be provided by the network (e.g., by base station 402 in signal 403). Should the UE 404 be mobile in a vehicle, the map may enable the UE 404 to predict that it is moving towards a corner, turnaround, or other obstruction. Thus even if the obstruction cannot be seen by the UE's transmissions, the UE 404 can take the presence of these obstructions into account when determining configuration factors like its beam shape and its duplex mode. As noted above, these instructions may be made by the base station 402 instead.

In the latter example, the UE 404 may use its processing resources to make specific predictions and to communicate those predictions to the base station at 407. At 409, the base station 402 either determines a communication configuration based on the UEs provision of assisting information at 407, or the base station authorizes (approves) the UE's communication configuration sent to the base statin 402 at 407—depending on the configuration. The communication configuration may, for example, authorize UE 404 to communicate with V2X on a sidelink channel using a duplex mode and beam configuration that attempts to ameliorate the predicted obstacles and that takes into account the movement of the various nodes.

Next, at 410, the UE modifies its duplex mode, transmit and receive beam configurations, and other parameters provided by the base station at 409 in the communication configuration. The base station 402 may have determined that the obstructions are becoming progressively worse. Thus, at 410, the wireless node (here, UE 404) may adapt to the communication configuration by providing a wider receive beam 413b, which may have a weaker distribution of energy but which also may be directionally favorable to receive transmissions from vehicle 408 even if a lot of changing clutter is present. UE 404 may also operate at half-duplex. UE and the V2X may initiate the communication at the prescribed time. While sacrificing the achievable bandwidth, the UE 404 may significantly reduce the self-interference that it may experience if it had run at FD. The net result during communications in the prescribed time period may be more favorable data rates and lower latencies for the communications 420 and 424 between the UE 404 and the V2X in vehicle 408.

As another example, where the clutter and blocker presence is relatively small but the distance between the nodes is a factor, the UE 404 may instead be configured to focus its beam in a manner that maximizes its transmit power and receive capabilities in a given direction, and thus the predicted configurations may benefit both nodes when these other circumstances are present. Conversely, if the reflecting surface were a large truck or a metallic building surface instead of a road-sign, the self-interfering signal 418 may be strong enough to indicate to the UE 404 that during a specific future time, communicating with another node (e.g., V2X 408) may be infeasible to do so in FD. In short, the assisting information may identify the temporal and spatial circumstances under which the base station may establish a communication configuration that minimizes the negative impact of all these potential obstacles to communication.

Following the time period of the sidelink communications with V2X, the UE 404 may then provide a scheduled update to the gNB at 427. The UE 404 may provide data obtained from V2X for forwarding by the network to an intended recipient. Alternatively or additionally, at 427 the UE 404 may provide the base station 402 with feedback about the various channel conditions encountered, the error rates of its sidelink transmissions, etc. The base station 402 can in turn use this feedback for future predictive communications.

Referring now to V2X, in some implementations, the network topography may incorporate (through county ordinances or otherwise) areas or zones that are predefined with certain regulated speeds. Thus, for example, in a high speed zone, the UE 404 may request that the base station 402 allow it to disable FD transmission mode to avoid potentially excessive interference along with the complexity and uncertainty of fast moving obstacles that change quickly over time. In other zones with speed limits that are more modest, the UE 404 may be able to know or predict is future trajectory, and with that information, its itinerary can be predicated along with a suitable communication configuration, such as a mix of FD and HD and a slowly changing beam over a specified time period (as one possible example).

In yet other configurations, a wireless node may be configured as a robotic UE. The robotic UE may be moving, or it may have a periodic motion. For example, thee robotic UE may be performing some task that requires it to move its arms in a designated periodic motion. Thus, in this implementation, the robotic UE may quickly be able to learn the best choices of beams or modes of operation based at least in part on the periodic positioning of the arm in different angles.

The configurations described above may result in the UE or node requesting a change of the duplex mode (from HD to FD and vice versa) and/or the TX/RX beam configuration to be used in the future or upcoming slots based on the predictions made that, in turn, may be based on the sets of available information that have accumulated over time. Some of the information is random or semi-random (e.g., vehicular movement in cases near roadways), but even in this context, there may be predictable patterns at different times of the day that tend to militate for or against a more or less aggressive communication configuration.

In a number of the examples above, the base station may provide authorization for the configuration. In some implementations, however, the base station authorization may be implicit, such as in the case where the UE has reported its measurements/predictions (as applicable) to the base station and the base station fails to respond for a specified time. This may grant the UE tacit authorization. In still other implementations, the node may itself be conferred with authority to determine the optimal communication configuration even if the upcoming time periods are scheduled by the network. In still other implementations, the node may be granted still further authority.

In further configurations, the UE may measure, assess, request, or predict a number of other parameters. In various implementations, certain of these parameters may be part of the communication configuration themselves. In still other implementations, the parameters may be assisting information that assists in yielding the communication configuration. In still other implementations, there is some mix of these parameters that serve one of the two purposes.

Some of the relevant parameters that may be used for predictive purposes or for the communication configuration itself include:
- Change in self interference measurements
- Change in reporting (these changes may be to disable the action, enable the action, or periodically perform the action
- Beam management (measurements/reporting)
- Schedule (time/frequency resources, Modulation & Coding Scheme (MCS), data rate, number of layers, etc.)
- Amount of guard bands (e.g., between an uplink and downlink communication)—more volatile network environments may favor wider guard bands to reduce the risk of interference
- Time adjustments
- Cyclic prefix (CP) sizes
- Subcarrier spacing (SCS)
- Reference Signals (RS) resource/configuration (e.g., the benefits from making orthogonal the uplink and downlink demodulation reference signals)

Additionally, or alternatively, the UE may provide assisting information which enables the network (e.g., gNB) to identify the configuration. Assisting information can include one or more of the factors above. In addition, the below provides a non-exhaustive list of assisting information:
- Direction/duration of mobility (the nodes and/or clutter)
- Speed (of the clutter or nodes)
- Time of incident (when the requested change should be adopted, e.g., arrays of solar panels change in angle every day at a certain time, etc.)
- Duration of incident (e.g., duration of exposure of panels, etc.)
- Map/corner/turn/direction information
- Average zone speed and area of zone (Positions can be based on average position of UE(s)
- Planned/predicted trajectory/itinerary
- Periodic pattern, e.g., periodicity and duration of adopting a set of configurations (such as the robotic UE discussed, supra)

The above examples of assisting information are but a few, and do not purport to cover an exhaustive list, each of which is deemed to fall within the spirt and scope of the present disclosure.

In other configurations, the base station (or other controlling wireless node) can participate in the prediction process more proactively. In one case, for example, the gNB may receive the request (to implement the communication configuration) and/or assisting information (to make the necessary predictions and thereby determine the communication configuration on behalf of the node). The gNB may take the assisting information into account for actions like deciding the duplex mode and/or selecting the TX/RX beams for us in the upcoming continuation. The gNB may schedule the UE, or allocate resources to the UE or other wireless devices/nodes, based on its own predictions. Depending on the progression of future networks, including their topology and architectures, any part of the above recitation of parameters and differences may be combined to yield a set of predictions and thereafter a communication configuration, based on the initial assisting information.

In another aspect of the disclosure, the UE still has to receive a configuration from the gNB prior to being scheduled for a DL/UL session. The predictive model may then seamlessly fit into the current architecture, and may continue to undergo development. As noted above, in an alternative configuration, the UE can issue its request/assisting information and wait a specified time. If the gNB fails to object or provide a substitute configuration, the UE's configuration can be objected.

The schedule or configuration selected by the gNB or other node (based on the provided assisting information) can be further base on the past measurements and information received from the UE, other UEs, other network nodes, available sensors, gNB's own measurements in a given environment (e.g., via AI/ML learning methodology), and other criteria. As assisting information at a given gNB continues to be learned and to be received, the use of the predictive technology described herein continues to become more valuable. For example, the communications can be made with fixed clutters and blockers already accounted for, and with deeply ingrained patterns of variable interference (traffic at different times, for example, train schedules), are also used to the advantage of the communicating nodes.

The present disclosure may apply diversely to 5G NR. In addition, the architecture of the IAB node system, with some node acting as parents to children nodes and some nodes acting as equivalent to UEs, makes it amenable to adopting the predictive scheme provided therein. Advantages in general include dynamically optimizing network performance and providing learning networks that can over time apply incidents, for example, in a given region to maximize performance of unrelated nodes by using preexisting patterns. Thus, the disclosed subject matter applies to IAB networks, and combinations of IAB networks with 5G, LTE and other networks.

Figure 5:
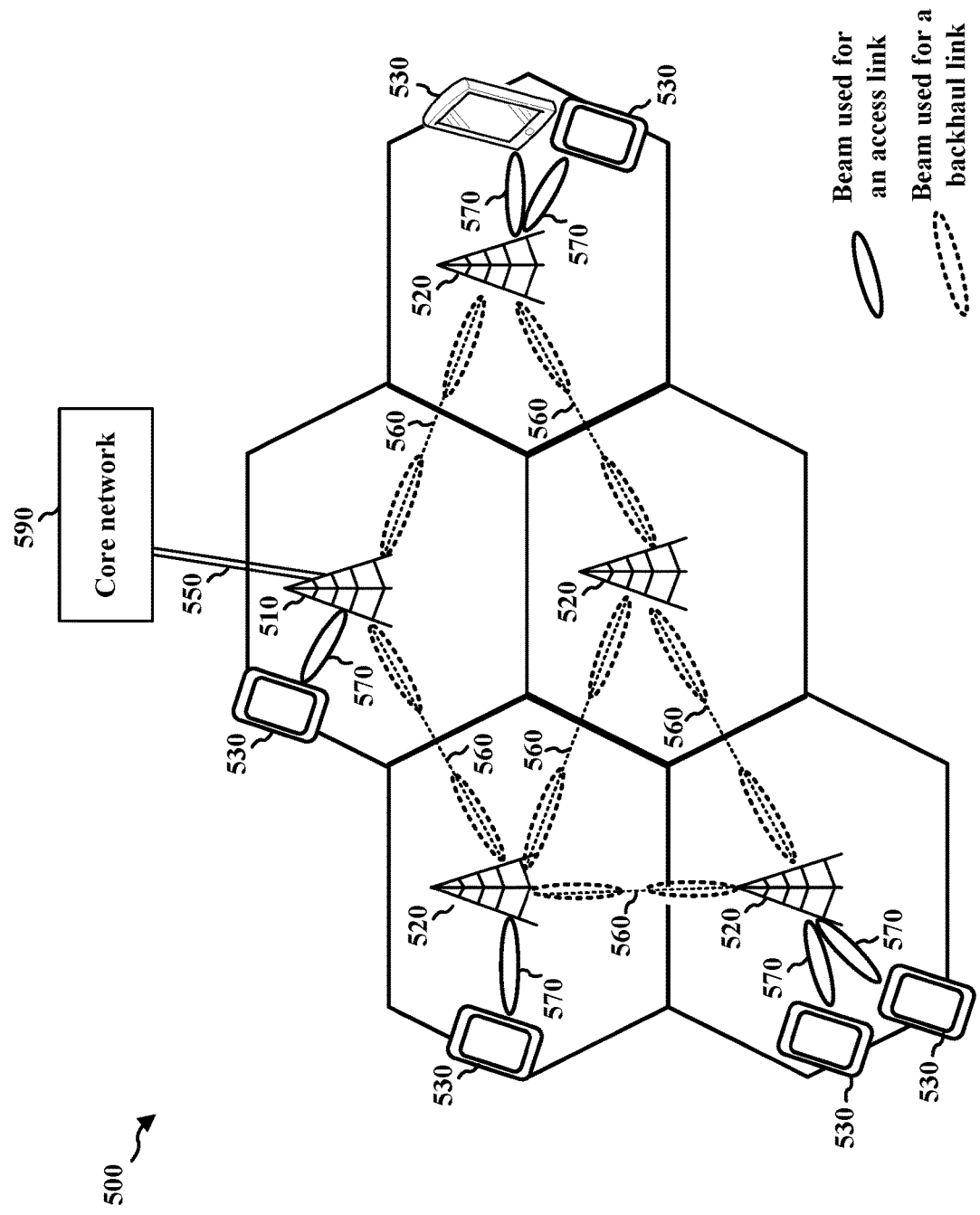
FIG. 5 is a diagram illustrating an example IAB network.

The wireless nodes of this disclosure include nodes used in an IAB network. FIG. 5 is a diagram illustrating an IAB network 500. The IAB network 500 may include an anchor node (that may be referred to herein as an "IAB donor") 510 and access nodes (that may be referred to herein as "IAB nodes") 520. The "IAB donor" nodes and "IAB nodes" may simply be referred to herein as "IAB nodes", which are included as part of the wireless nodes. The IAB donor 510 may be a base station, such as a gNB or eNB, and may perform functions to control the IAB network 500. The IAB nodes 520 may comprise L2 relay nodes, etc. Together, the IAB donor 510 and the IAB nodes 520 share resources to provide an access network and a backhaul network to core network 590. For example, resources may be shared between access links and backhaul links in the IAB network.

UEs 530 interface with the IAB nodes 520 or the IAB donor 510 through access links 570. The IAB nodes 520 communicate with each other and with the IAB donor 510 through backhaul links 560. The IAB donor 510 is connected to the core network 590 via a wireline backhaul link 550. UEs 530 communicate with the core network by relaying messages through their respective access link 570 to the IAB network 500, which then may relay the message through backhaul links 560 to the IAB donor 510 to communicate to the core network through the wireline backhaul link 550. Similarly, the core network may communicate with a UE 530 by sending a message to the IAB donor 510 through the wireline backhaul link 550. The IAB donor 510 sends the message through the IAB network 500 via backhaul links 560 to the IAB node 520 connected to the UE 530, and the IAB node 520 sends the message to the UE 530 via the access link 570.

Each IAB node, e.g., including IAB donor 510 and each IAB node 520, may use a PCI value. The PCI value may serve as an identifier for that IAB donor 510 or IAB node 520. The PCI value may be used to determine a scrambling sequence that is applied to physical signals and/or channels that are transmitted by a particular IAB node. For example, a PSS and/or the SSS transmitted by the respective IAB donor 510 or IAB node 520 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 6:
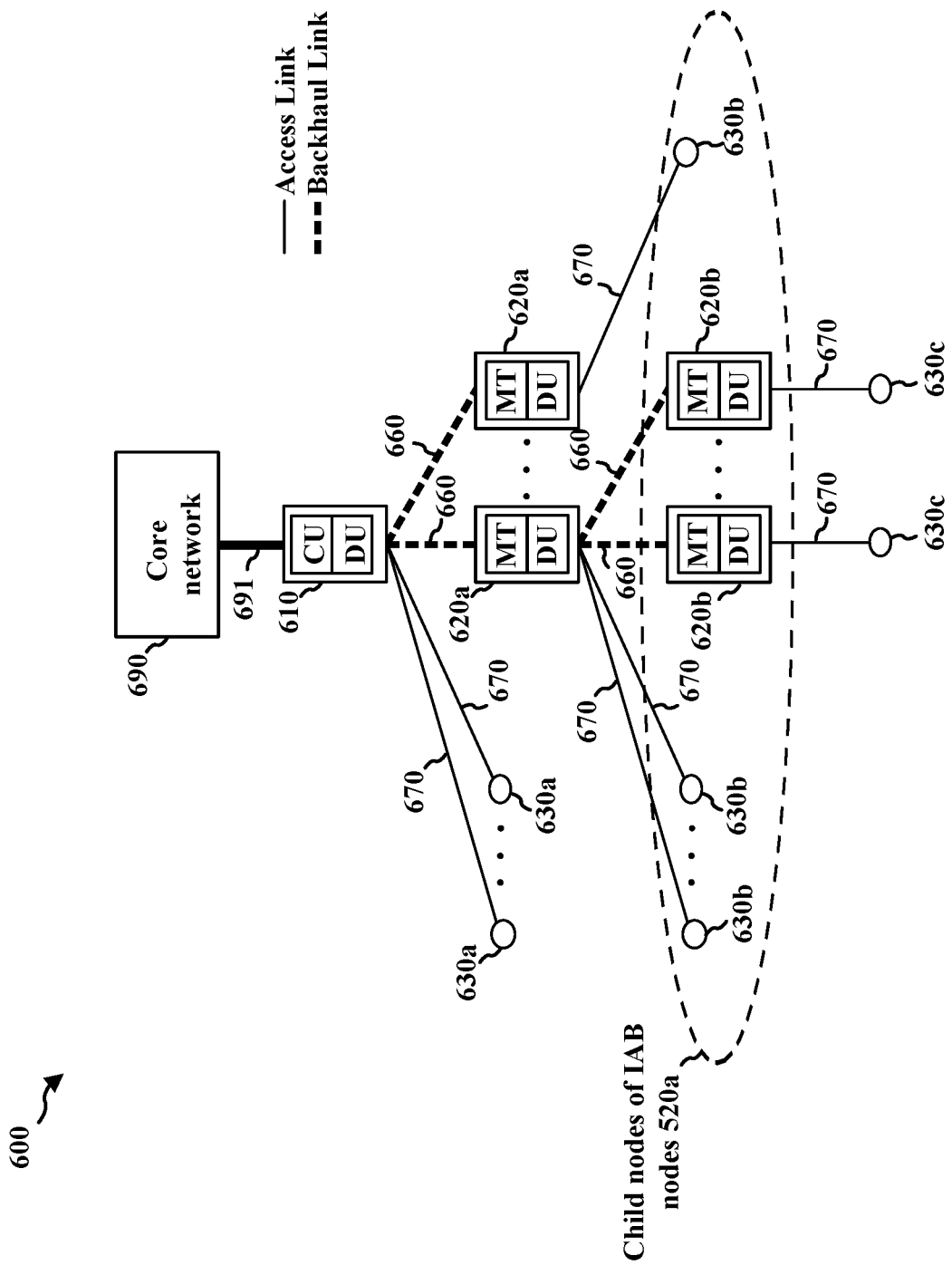
FIG. 6 is a diagram illustrating an IAB network and components thereof.

FIG. 6 is a diagram illustrating an IAB network 600 and components thereof. The IAB network 600 includes an IAB donor 610 and IAB nodes 620. The IAB nodes, as well as the IAB donor, may provide wireless access links to UEs 630.

The IAB donor 610 may be considered a root node of the tree structure of the IAB network 600. The IAB donor node 610 may be connected to the core network 690 via a wired connection 691. The wired connection may comprise, e.g., a wireline fiber. The IAB donor node 610 may provide a connection to one or more IAB nodes 620a. The IAB nodes 620a may each be referred to as a child node of the IAB donor node 610. The IAB donor node 610 may also provide a connection to one or more UE 630a, which may be referred to as a child UE of IAB donor 610. The IAB donor 610 may be connected to its child IAB nodes 620a via backhaul links 660, and may be connected to the child UEs 630a via access links 670. The IAB nodes 620a that are children nodes of IAB node 610 may also have IAB node(s) 620b and/or UE(s) 630b as children. For example, IAB nodes 620b may further connect to child nodes and/or child UEs. FIG. 6 illustrates IAB nodes 620b providing an access link to UEs 630c, respectively.

The IAB donor 610 may include a central unit (CU) and a distributed unit (DU). The central unit CU may provide control for the IAB nodes 620a, 620b in the IAB network 600. For example, the CU may be responsible for configuration of the IAB network 600. The CU may perform RRC/PDCP layer functions. The DU may perform scheduling. For example, the DU may schedule resources for communication by the child IAB nodes 620a and/or UEs 630a of the IAB donor 610.

The IAB nodes 620a, 620b may include a mobile termination (MT) and a DU. The MT of IAB node 620a may operate as a scheduled node, scheduled similar to a UE 630a by the DU of the parent node, e.g., IAB donor 610. The MT of IAB node 620b may operate as a scheduled node of parent node 620a. The DU may schedule the child IAB nodes 620b and UEs 630b of the IAB node 620a. As an IAB node may provide a connection to an IAB node that in turn provides a connection for another IAB node. The pattern of a parent IAB node comprising a DU that schedules a child IAB node/child UE may continue to more connections that illustrated in FIG. 6.

In wireless communication systems that support full duplex (FD) communication, self-interference may be an issue that may affect FD communications. Self-interference may occur if a transmitted signal is leaked to the receive port of the transmitting device. In addition, the transmitted signal may be reflected by an object back to the receive port, which may be known as clutter echo. Reducing self-interference, especially clutter echo, via spatial isolation by properly choosing transmit and receive beams or more advanced transmit/receive beamforming may assist in supporting FD communication. FD communication allows for simultaneous UL and DL transmission in FR2 and different associated aspects of procedures. Flexible TDD capability may be present at either a base station (e.g., gNB) or UE or both. For example, a UE in FD communication may transmit UL from one antenna panel and receive DL in another antenna panel. FD communication may be conditional on UL/DL beam separation. FD communication may result in a reduction of latency, such that it may be possible to receive a DL signal in UL only slots. At least another benefit is that FD communications may provide for a spectrum efficiency enhancement (e.g., per cell or per UE), which may allow for an increase in efficient resource utilization.

Self-interference measurements may be performed to determine whether FD capability may be supported or not, or may be enabled/enhanced at a wireless device. To perform self-interference measurements, the wireless device may send a signal from a first set of antennas on one or more transmit beam directions, and may measure the received signal (e.g., reflected back or leaked transmission signal) on a second set of antennas on one or more receive beam directions.

FIGS. 7A-7C are diagrams illustrating examples 700, 710, 720 of full duplex (FD) communication. The example 700 of FIG. 7A includes a UE1 702 and two base station (e.g., TRPs) 704-1, 704-2, wherein the UE1 702 is sending uplink transmissions to base station 704-1 and is receiving downlink transmissions from base station 704-2. In the example 700 of FIG. 7A, FD is enabled for the UE1 702, but not for the base stations 704-1, 704-2. The example 710 of FIG. 7B includes two UEs, UE1 702-1 and UE2 702-2 and a base station 704, wherein the UE1 702-1 is receiving a downlink transmission from the base station 704 and the UE2 702-2 is transmitting an uplink transmission to the base station 704. In the example 710 of FIG. 7B, FD is enabled for the base station 704, but not for the UEs UE1 702-1 and UE2 702-2. The example 720 of FIG. 7C includes a UE1 702 and a base station 704, wherein the UE1 702 is receiving a downlink transmission from the base station 704 and the UE1 702 is transmitting a uplink transmission to the base station 704. In the example 720 of FIG. 7C, FD is enabled for both the UE1 702 and the base station 704.

Beam separation of the transmit and receive beams assist in limiting or reducing self-interference that may occur during FD communication. It is desirable to account for clutter (also known as "clutter echo") when configuring self-interference measurements to minimize self-interference. Determining whether clutter echo is present may allow for the self-interference measurement configuration to be adjusted, which may provide a reliable FD communication by selecting beam pairs that minimize or reduce self-interference.

Aspects presented herein improve self-interference measurement through the device performing the measurement providing capability information to a device that configures the node for subsequent communications. For example, a UE may provide UE results of a self-interference measurement to a base station, an IAB node, or another UE. The device receiving this information may use the information to determine a communication configuration for the UE. It should be noted that some aspects of the SIM configuration may be based on information that is known or experienced by the UE rather than the base station, for example.

Figure 8:
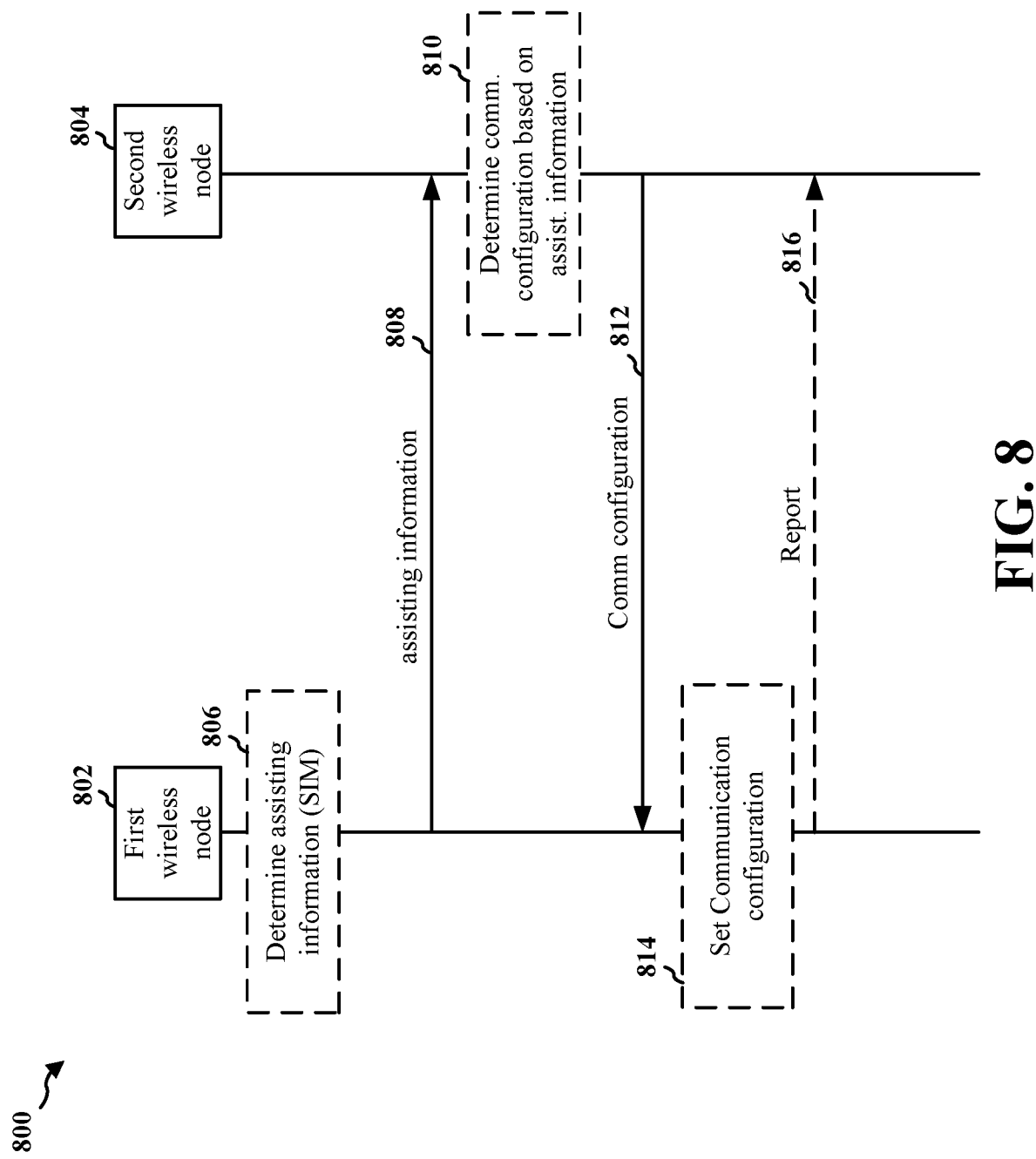
FIG. 8 is a call flow diagram between a first wireless device and a second wireless device.

FIG. 8 is a call flow diagram 800 between a first wireless device 802 and a second wireless device 804. Optional aspects are illustrated with a dashed line. In some aspects, the first wireless device 802 may be a UE and the second wireless device 804 may be a base station, where the base station provides a cell serving the UE. In other examples, the first wireless device 802 may be a UE and the second wireless device 804 may be an IAB node. In other examples, the first wireless device may be an IAB node (e.g., a child node) and the second wireless device may be a parent IAB node, a central unit, a donor node, or a base station. For example, in the context of FIG. 1, the second wireless device 804 may correspond to the base station 102/180 or an IAB node 103. Further, the first wireless device 802 may correspond to a UE 104 or an IAB node 103. In another example, in the context of FIG. 3, the second wireless device 804 may correspond to the device 310, and the first wireless device 802 may correspond to the device 350.

As illustrated in FIG. 8, the first wireless device 802 may provide assisting information 806 to the second wireless device 804. The assisting information may include the results of a SIM measurement performed by the first wireless device 802. In order to perform the SIM measurement, the first wireless device may have activated both the transmit and receive beam pairs to transmit and receive simultaneously. This may help enable the first wireless device to measure the extent or amount the reflected transmission is negatively affecting a data reception that the first wireless device may be trying to receive. The second wireless device may use the assisting information and other relevant information to predict a communication configuration for the first wireless device 802, as illustrated at 810. Then, the second wireless device 804 may provide the communication configuration 812 to the first wireless device 802 for use in a subsequent communication.

After receiving the communication configuration 812, the first wireless node 802 sets its communication configuration, at 814. The first wireless node 802 may optionally transmit a report 816 to the second wireless node 804 based on the communication configuration.

Although the disclosure is described above in terms of a UE and a base station, as noted with respect to IAB nodes, the disclosure may be equally applicable to other nodes including V2X nodes, mobile relays, and the like. Some non-exhaustive examples include sidelink/V2X (two UEs communicating with each other via the sidelink). Examples of sidelink/V2X communication may include:
1. Ex. 1.1 RX (scheduled) UE requesting/providing information to TX (scheduling). UE→scheduling UE takes it into account.
2. Ex. 1.2. TX (scheduling) UE providing information or in-advance configuration to the RX (scheduled) UE.
3. Ex 1.3. UE1 requesting/providing information to the gNB/RSU who is in charge of scheduling/assisting the direction communication between two UEs.
4. Ex 1.4. UE1 broadcasts/multicast parts of this information in one or multiple directions.

IAB: IAB-node may be mobile itself or its surrounding environment is very dynamic.
5. Ex 2.1. IAB-node requesting/providing info to its parent-node.
6. Ex 2.2. IAB-node requesting/providing info to its CU→CU takes it into account for IAB resource management, TDDconfiguration of IAB-node or other nodes (e.g. it parents/children), etc.
7. Ex 2.3. IAB-node providing information or in-advance configuration to its served UEs/child IAB-nodes.
8. Ex 2.4. IAB-node broadcasts/multicast parts of this information in one or multiple directions.
9. Mobile relay/repeater:
   Indication to its donor DU and/or CU.

Figure 9:
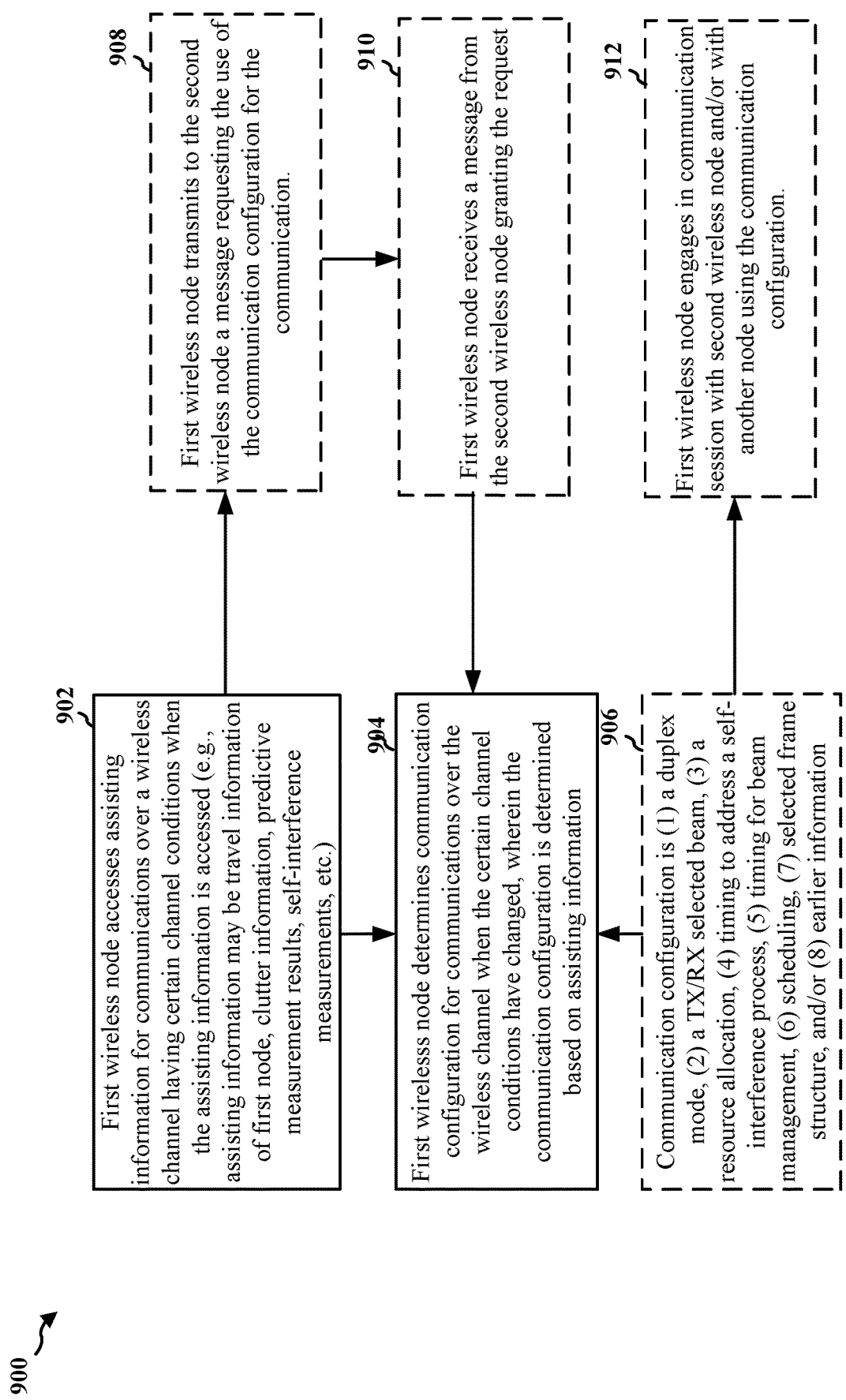
FIG. 9 is a flowchart of a method of wireless communication.

FIG. 9 is a flowchart of a method of wireless communication by a first wireless node. While the first and second wireless nodes may be any number of different nodes as described above, in one configuration the first wireless node is a UE 104 (including a child IAB node) of FIG. 1, the UE 350 of FIG. 3, one of the IAB nodes in FIGS. 5-7, a UE 1202 in FIG. 11, a mobile relay, or a V2X node (FIG. 4).

At 902, the first wireless node (e.g., UE 104) accesses assisting information for communications over a wireless channel having certain channel conditions when the assisting information is accessed (e.g., assisting information may be travel information of first node, clutter information, predictive measurement results, self-interference measurements, etc.). Thereupon, at 904, the first wireless node (e.g., the UE 104) determines communication configuration for communications with second node over the wireless channel when the certain channel conditions have changed, wherein the communication configuration is determined based on assisting information. Thus, the first wireless node may determine the optimal communication configuration based on the assisting information it receives.

The dashed lines represent optional features. As noted in 906, the communication configured for the first wireless node may be (among other features) a (1) a duplex mode (full or half), (2) a TX/RX selected beam, (3) a resource allocation, (4) timing to address a self-interference process, (5) timing for beam management, (6) scheduling, (7) selected frame structure, and/or (8) earlier information.

In optional step 908, after determining the communication configuration, the first wireless node transmits to the second wireless node (e.g., base station 180) a message requesting the use of the communication configuration for the communication. Thereafter, at step 910, the first wireless node (e.g., UE 104), may receive a message from the second wireless node granting the request. Control then returns to step 904, where the first wireless node uses the communication configuration (e.g., full duplex with a prescribed number of beams and beamwidth, a specific spatial multiplexing scheme, and a different modulation and coding scheme).

In step 912, the first wireless node engages in communication session with second wireless node and/or with another node using the communication configuration. Thus, for example, the UE 104 may engage in an uplink with the base statin 180 using the communication configuration, or in other configurations, the UE 104 may subsequently communicate with one or more other nodes in a sidelink configuration (or via another network topology) using the predicted communication configuration.

Figure 10:
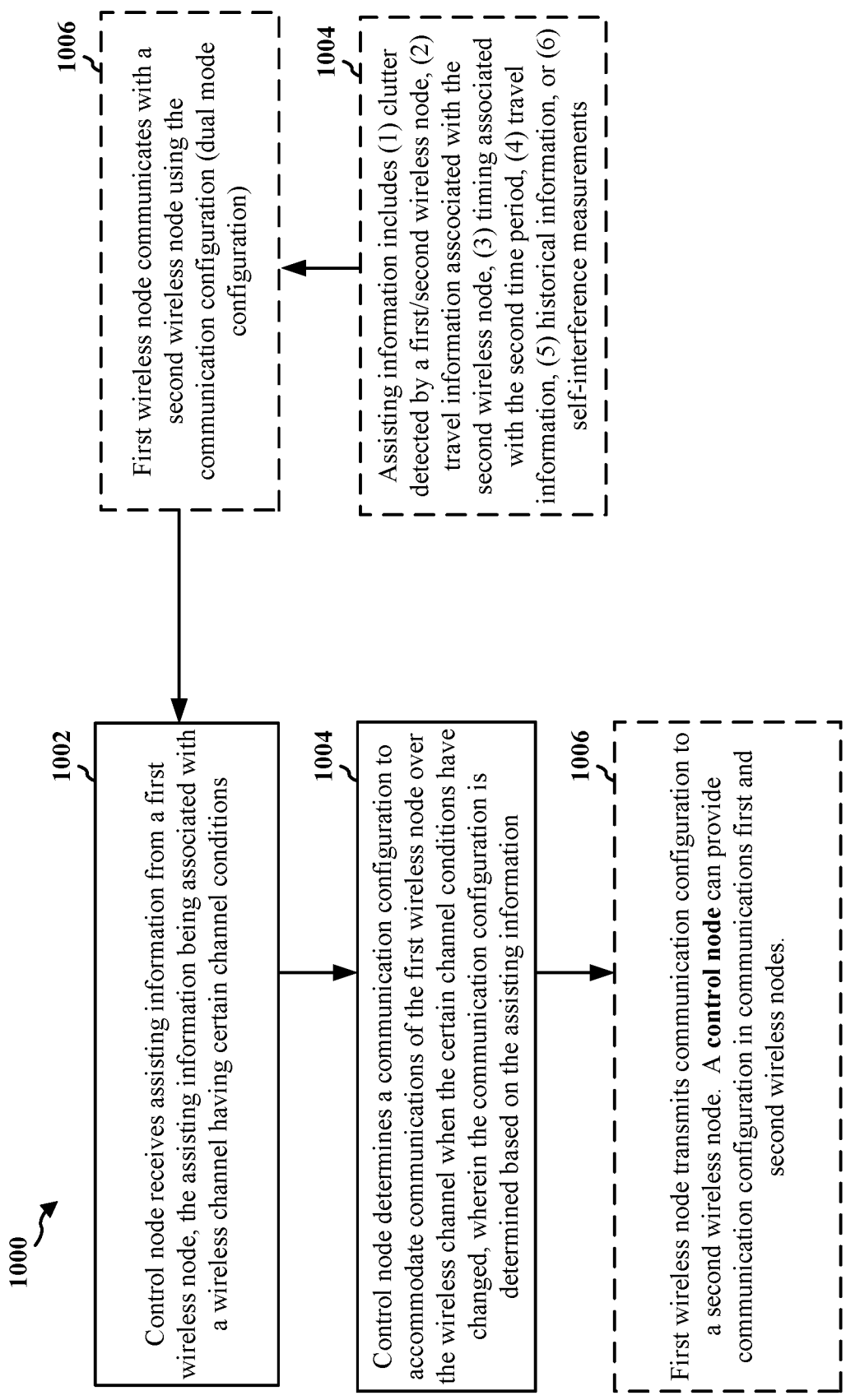
FIG. 10 is a flowchart of a method of wireless communication.

FIG. 10 is a flowchart of a method of wireless communication. While the wireless nodes may be any number of different nodes as described above, in one configuration the first wireless node is a base station or an IAB donor node. For example, the first wireless node may be the base station 180 or the IAB node 103, the base station 310 of FIG. 3, one of the IAB donor nodes in FIGS. 5-7, or the base station of FIG. 12. Under various circumstances, the first wireless node may be another wireless node (e.g., a V2X node, a mobile relay, and the like), and the second wireless node may be a UE or any of the aforementioned.

Referring to step 1002, the first wireless node (e.g., base station 180 or IAB donor node 103) may receive assisting information from a second wireless node over a wireless channel having certain channel conditions. At 1004, the first wireless node may determine a communication configuration to accommodate communications with the second wireless node over the wireless channel when the certain channel conditions have changed, wherein the communication configuration is determined based on the assisting information.

Optional block 1006 indicates that the communication configuration may be transmitted to a third wireless node, which can use the second node during communications with the third wireless node. In this embodiment, the first wireless node acts as a control node, in that it does not participate in the present communication but that it determines a communication configuration that the third wireless node can use in a communication with the second node.

Optional feature 1006 indicates that the first wireless node communicates with the second wireless node using the communication configuration, so that in this case it is effectively a dual mode configuration. That is to say, the first and second wireless nodes both participate in the communications. The request may be derived from a user station 104, for example, that provided the assisting information. The message may instead include assisting information, which at optional feature 1004 may include (1) clutter detected by the second wireless node, (2) travel information associated with the second wireless node, (3) timing associated with the second time period, (4) travel information (e.g., information pertaining to the movement of clutter or of the nodes measuring the information), (5) historical information (e.g. including information gathered by past nodes about obstacles, buildings, hills, terrain, periodic traffic flow and other features), or (6) self-interference measurements.

Figure 11:
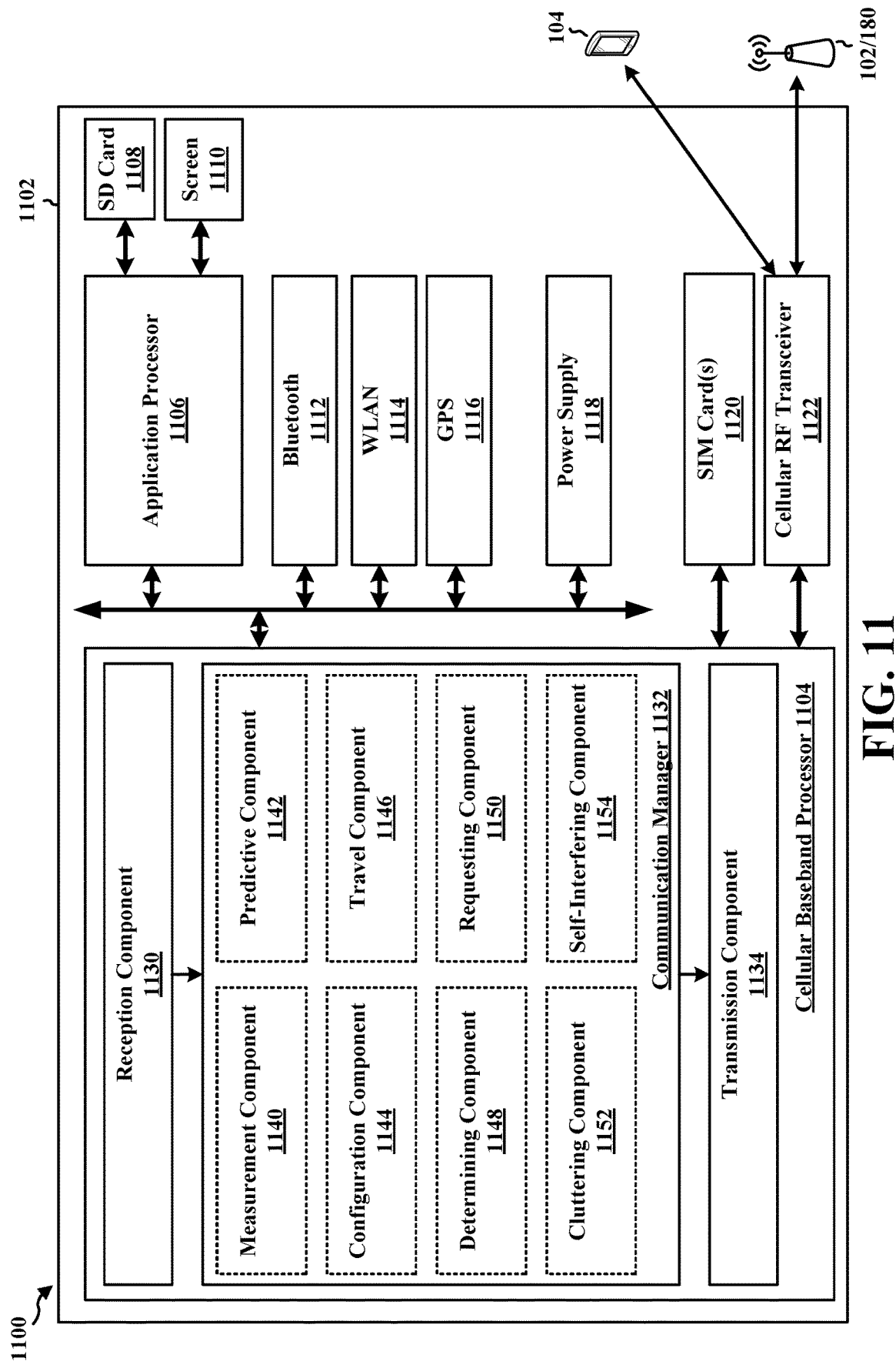
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a component 1140 that is configured to take measurements, such as assisting information, e.g., as described in connection with step 902 of FIGS. 9 and 1004 and 1006 of FIG. 10. The communication manager 1132 further includes a component 1142 that receives input in the form of assisting information from the component 1140 and is configured to calculate predictions and predictive features based on the assisting information, e.g., as described in connection with step 904 of FIG. 9. The communication manager 1132 further includes a component 1144 that receives input in the form of travel information (measurement of obstacles) from the component 1140 and input in the form of predictions from the component 1142 and input in the form of determinations from component 1148 and is configured to use a communication configuration in a communications session, e.g., as described in connection with step 904 from FIG. 9.

The communication manager 1132 further includes a component 1148 to use input from the various components in FIG. 9, such as the measurement predictive and travel components 1140, 1142 and 1146, respectively, to determine a communication configuration for use in a communication session. The communication manager 1132 further includes a component 1150 that is used to perform requesting steps in the various flow diagrams, including requesting use of configurations. The communication manager 1132 further includes a cluttering component 1152 that is configured to scan for clutter or blockers during the course of a measurement. The communication manager 1132 further includes a component 1154 that is configured to perform self-interfering measurements to gather information on self-interference, as demonstrated in the various steps and diagrams, supra, and which information is provided as necessary to components 1142, 1133, and 1148, for example.

The apparatus may include additional components that perform each of the blocks of the algorithm in the aforementioned timing diagrams and flowcharts of FIGS. 4 and 8-10. As such, each block in the aforementioned flowcharts of FIGS. 4 and 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for accessing assisting information for communications over a wireless channel having certain channel conditions when the assisting information is accessed; means for determining a communication configuration for communications with a second node over the wireless channel when the certain channel conditions have changed, wherein the communication configuration is determined based on the assisting information; means for transmitting to the second wireless node a message requesting the use of the communication configuration for the communication; and means for receiving a message granting the request.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
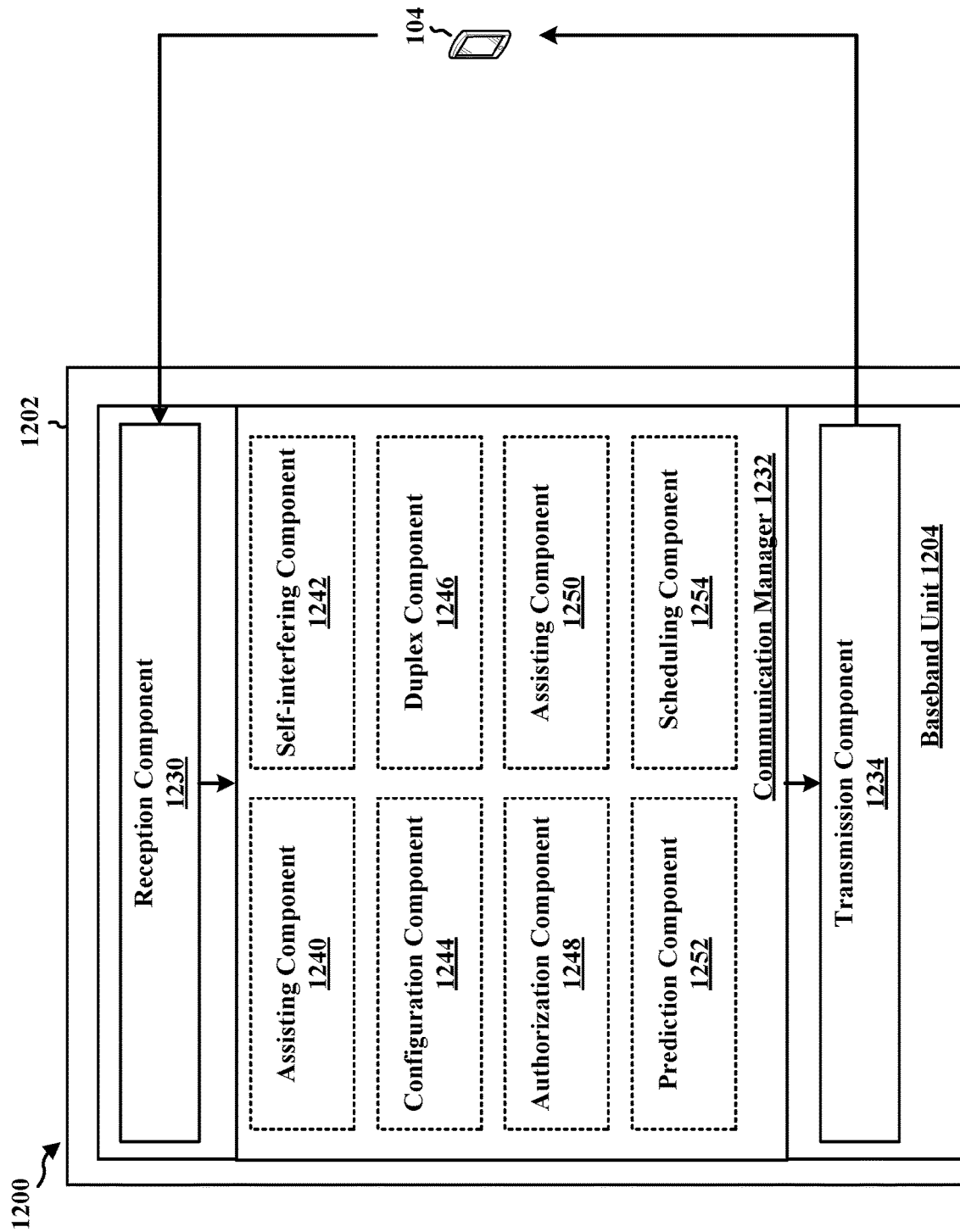
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a component 1240 that is used to receive, analyze and make predictions based on assisting information, e.g., as described in connection with certain configurations of step 1002 in FIG. 10. The communication manager 1232 further includes a component 1242 that configures and receives self-interfering measurements and uses these measurements for predicting communication configurations, e.g., as described in connection with FIG. 4 and in in steps 1004 and 1006 of FIG. 10. The communication manager 1232 further includes a configuration component 1244 that receives input in the form of assisting information from component 1240 and that is configured to determine communication configurations e.g., as described in connection with 1004 and 1006 of FIG. 10 and in various other illustrations in the disclosure. The communication manager 1232 further includes a configuration component 1246 that is configured to perform duplex calculations (e.g., half-duplex, full-duplex) and to provide this information to component 1244. The communication manager 1232 further includes a configuration component 1248 which is configured to authorize communication configurations on behalf of wireless nodes, e.g., as described in step 910 of FIG. 9. The communication manager 1232 further includes a configuration component 1252, which is configured to assist component 1244 in making predictions based on information from component 1240 to determine a communication configuration, as described and illustrated in various steps throughout the disclosure. The communication manager 1232 further includes a configuration component 1254, which is configured to schedule communication sessions, to receive the communication configuration from component 1244 and to provide the information to the transmission component 1234, if necessary, to enable the transmission component 1234 to up-convert the information and send it over the network to the node that will be scheduled for the communication session, e.g. as shown in step 1002 in FIG. 10.

The apparatus may include additional components that perform each of the blocks of the algorithm in the aforementioned flowcharts of FIGS. 4 and 8-10. As such, each block in the aforementioned flowcharts of FIGS. 4 and 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for receiving assisting information from a second wireless node over a wireless channel having certain channel conditions; means for determining a communication configuration to accommodate communications with the second wireless node over the wireless channel when the certain channel conditions have changed, wherein the communication configuration is determined based on the assisting information; means for communicating with the second wireless node using the communication configuration; means for transmitting the communication configuration to a third wireless node; means for allocating resources for another wireless node based on the assisting information; and means for transmitting the communication configuration to the second wireless node.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a control node, comprising:
   receiving assisting information from a first wireless node over a wireless channel having certain channel conditions, the assisting information being associated with a wireless channel of the first wireless node having the certain channel conditions; and
   determining a communication configuration to accommodate future communications of the first wireless node over the wireless channel when the certain channel conditions have changed, wherein the communication configuration is determined for use at a subsequent time period based on the assisting information.

2. The method of claim 1, further comprising requesting a change of duplex mode or transmitter and receiver (TX/RX) beam configuration to be used in future slots when communicating with the first wireless node using the wireless channel and based on the communication configuration.

3. The method of claim 1, further comprising transmitting the communication configuration to a second wireless node for use in a subsequent communication.

4. The method of claim 3, wherein the first and second wireless nodes communicate with each other in the subsequent communication using the wireless channel and based on the communication configuration.

5. The method of claim 1, wherein the assisting information comprises clutter detected by at least one of the first wireless node or a second wireless node.

6. The method of claim 1, wherein the assisting information comprises travel information associated with at least one of the first wireless node or a second wireless node.

7. The method of claim 1, wherein the assisting information comprises timing associated with the communications.

8. The method of claim 1, wherein the communication configuration comprises a duplex mode for the communication of at least one of the first wireless node or a second wireless node.

9. A control node, comprising:
   at least one processor configured to:
      receive assisting information from a first wireless node over a wireless channel having certain channel conditions, the assisting information being associated with a wireless channel of the first wireless node having the certain channel conditions; and
      determine a communication configuration to accommodate future communications of the first wireless node over the wireless channel when the certain channel conditions have changed, wherein the communication configuration is determined for use at a subsequent time period based on the assisting information.

10. The control node of claim 9, wherein the at least one processor is further configured to request a change of duplex mode or transmitter and receiver (TX/RX) beam configuration to be used in future slots when communicating with the first wireless node using the wireless channel and based on the communication configuration.

11. The control node of claim 9, wherein the at least one processor is further configured to transmit the communication configuration to a second wireless node for use in a subsequent communication.

12. The control node of claim 11, wherein the first and second wireless nodes communicate with each other using the wireless channel and based on the communication configuration.

13. The control node of claim 9, wherein the assisting information comprises clutter detected by at least one of the first wireless node or a second wireless node.

14. The control node of claim 9, wherein the assisting information comprises travel information associated with at least one of the first wireless node or a second wireless node.

15. The control node of claim 9, wherein the assisting information comprises timing associated with the communications.

16. The control node of claim 9, wherein the communication configuration comprises a duplex mode for the communication of at least one of the first wireless node or a second wireless node.

17. A first wireless node, comprising:
   means for receiving assisting information from a second wireless node over a wireless channel having certain channel conditions; and
   means for determining a communication configuration to accommodate future communications with the second wireless node over the wireless channel when the certain channel conditions have changed, wherein the communication configuration is determined for use at a subsequent time period based on the assisting information.

18. The first wireless node of claim 17, further comprising means for requesting a change of duplex mode or transmitter and receiver (TX/RX) beam configuration to be used in future slots when communicating with the second wireless node using the communication configuration.

19. The first wireless node of claim 17, further comprising means for transmitting the communication configuration to a third wireless node.

20. The first wireless node of claim 17, wherein the assisting information comprises clutter detected by the second wireless node.

21. The first wireless node of claim 17, wherein the assisting information comprises travel information associated with the second wireless node.

22. The first wireless node of claim 17, wherein the assisting comprises timing associated with the communications.

23. The first wireless node of claim 17, wherein the communication configuration comprises a duplex mode for the communication with the second wireless node.

24. A non-transitory computer-readable medium comprising code that, when executed by at least one processor, is configured to:
   receive assisting information from a second wireless node over a wireless channel having certain channel conditions; and
   determine a communication configuration to accommodate future communications with the second wireless node over the wireless channel when the certain channel conditions have changed, wherein the communication configuration is determined for use at a subsequent time period based on the assisting information.

25. The computer-readable medium of claim 24, further comprising code to request a change of duplex mode or transmitter and receiver (TX/RX) beam configuration to be used in future slots when communicating with the second wireless node using the communication configuration.

26. The computer-readable medium of claim 24, further comprising code to transmit the communication configuration to a third wireless node.

27. The computer-readable medium of claim 24, wherein the assisting information comprises clutter detected by the second wireless node.

28. The computer-readable medium of claim 24, wherein the assisting information comprises travel information associated with the second wireless node.

29. The computer-readable medium of claim 24, wherein the assisting information comprises timing associated with the communications.

30. The computer-readable medium of claim 24, wherein the communication configuration comprises a duplex mode for the communication with the second wireless node.

* * * * *